Sept. 10, 1963   K. D. SCHREYER ET AL   3,103,184
COMBINATION RAIL FOR TROLLEY CONVEYORS
Filed Nov. 27, 1959   2 Sheets-Sheet 1
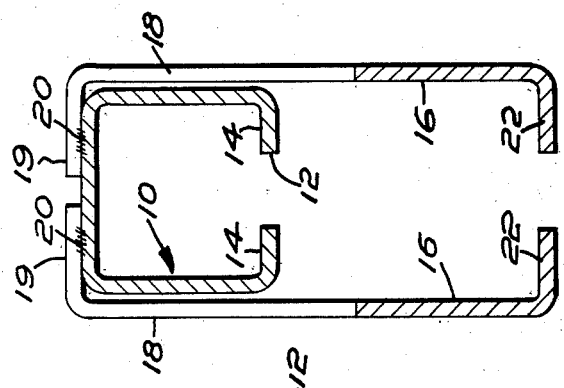
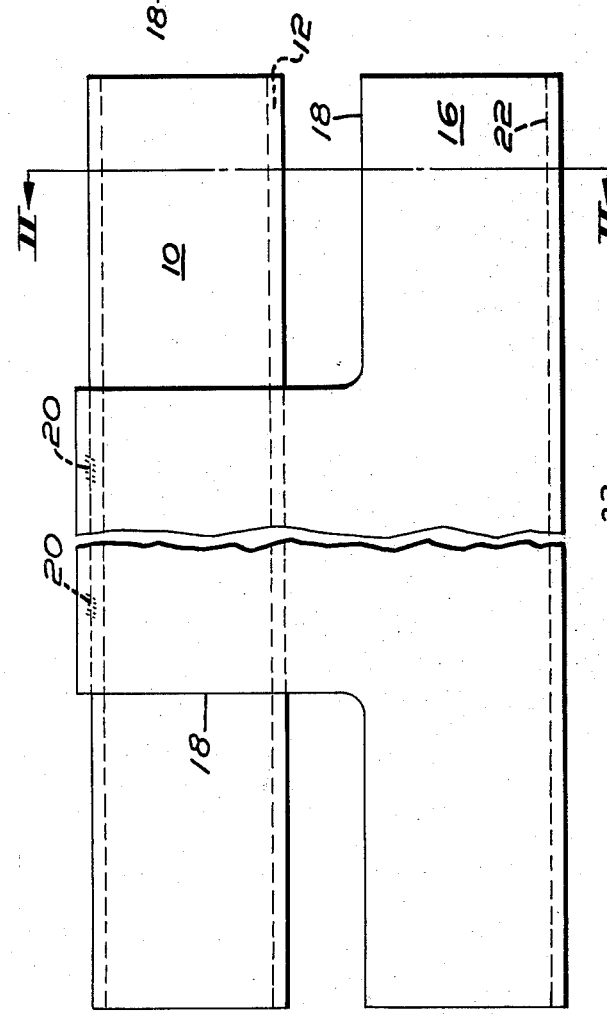
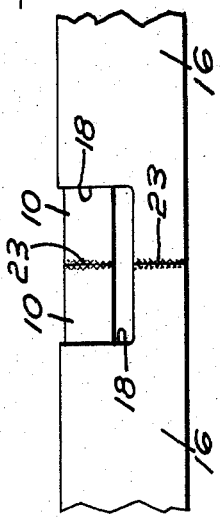
INVENTORS:
KENNETH D. SCHREYER
and HUMPHREY F. PARKER
BY
Beau, Brooks, Buckley & Beau,
ATTORNEYS.

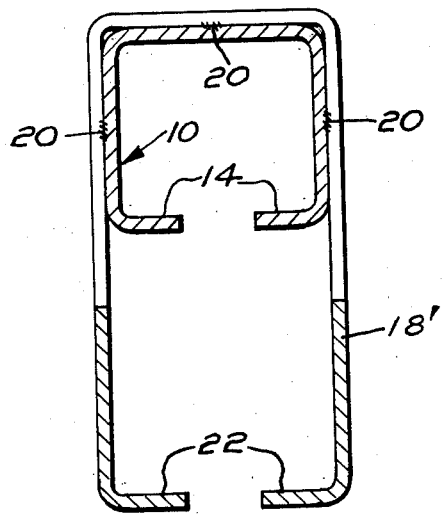

United States Patent Office 3,103,184
Patented Sept. 10, 1963

3,103,184
COMBINATION RAIL FOR TROLLEY
CONVEYORS
Kenneth D. Schreyer, Williamsville, and Humphrey F. Parker, Buffalo, N.Y., assignors to Columbus McKinnon Corporation, Tonawanda, N.Y.
Filed Nov. 27, 1959, Ser. No. 855,895
6 Claims. (Cl. 104—108)

This invention relates to trolley conveyor trackway devices, and more particularly to that type of trackway which comprises, in combination, a trolley conveying track and a power chain track.

It is an object of the present invention to provide an improved trackway structure as aforesaid which provides the requisite pair of track components while using less material than in the case of comparable prior art designs.

A further object of the invention is to provide an improved integral trackway structure as aforesaid which is simple in form and relatively inexpensive to fabricate.

Another object of the invention is to provide an improved trackway construction as aforesaid which eliminates the need of power chain guide carriages at positions intermediately of the trolley pick-up devices carried by the power chain at intervals therealong.

Other objects and advantages of the invention will appear from the specification hereinafter.

In the accompanying drawing:

FIG. 1 is a fragmentary side elevational view of a trackway structure of the present invention;

FIG. 1A is a view corresponding to FIG. 1 but at a track section joint;

FIG. 2 is a sectional view thereof taken along line II—II of FIG. 1; and

FIG. 2A is a view corresponding to FIG. 2 but of a slightly modified form of construction.

As shown in FIGS. 1, 2, one form of trackway of the invention is shown as including a power chain accommodating track component indicated generally at 10 which is in the form of a box-sectioned tubular member slotted through its bottom wall as indicated at 12. Thus, the rail component 10 is adapted to accommodate in free running relation therein a power chain having guide carriages disposed at intervals therealong, the bottom rail portions 14—14 of the rail component 10 being adapted to support the rollers of the power chain guide carriages.

To support the load carrying trolleys of the system, a pair of channel shaped bottom rails 16—16 are provided therealong having top flanges 19 which are welded as indicated at 20 to the top rail component 10. Thus, the bottom inturned flange portions 22—22 of the bottom rail components provide runways upon which ride the load trolley rollers, the flanges 22—22 being dimensioned to leave therebetween an appropriate slot through which the load trolley suspension brackets may freely extend. Thus it will be appreciated that by virtue of this construction a dual trackway structure is provided which is relatively simple and inexpensive to fabricate and which uses less structural material than comparable designs of the prior art, yet which is extremely rugged in form. As shown at 18—18 (FIGS. 1, 1A) the sides of the rails 16—16 are preferably cut away adjacent the ends of each length of track, so as to permit easy access to the abutting junctures of adjoining sections of rails 10 and 16 for welding as indicated at 23 (FIG. 1A) or otherwise joining them together to form an integrated rail system. FIG. 2A shows a modified form of the rail construction wherein a single rail member 18' replaces the dual members 18—18 of FIG. 2 and is formed to closely embrace the rail section 10. It is conveniently assembled by welding the parts together as indicated at 20.

Thus it will be appreciated that by virtue of the present invention important manufacturing economies are effected while at the same time providing a trolley conveyor trackway system embodying important features and advantages of construction; and that although only a few forms of the invention have been described in detail, various changes may be made therein without departing from the spirit of the invention or the scope of the following claims.

We claim:

1. In a rail system for conveyor assemblies, a power chain housing component and a trolley guide rail component, said power chain housing component including a pair of spaced, vertical side walls having inturned edge portions defining a pair of spaced, mutually opposed power chain rail flanges, said trolley guide rail component including a pair of spaced, vertical side walls having inturned lower edge portions defining a pair of spaced, mutually opposed trolley rail flanges, said power chain rail flanges being disposed in vertically spaced relation to said trolley rail flanges, the side walls of said power chain housing component being permanently joined to the side walls of said trolley guide rail component at points remote from the rail flanges of either component, and means bridging between and fixedly interconnecting the stated side walls at their region of joining.

2. The assembly as defined in claim 1 wherein the opposite ends of the side walls of said trolley guide rail component are cut away to expose the opposite ends of said power chain housing component.

3. The assembly as defined in claim 1 wherein said means comprises a top wall portion of said power chain housing component extending between and joining the side walls thereof.

4. The assembly as defined in claim 3 wherein said trolley guide rail component comprises a pair of vertically positioned and mutually opposed channel members, the top flanges of which overlie said top wall portion of said power chain housing component and are permanently secured thereto.

5. A rail assembly for conveyor systems characterized by its rigidity and economy of material used, said assembly comprising a plurality of end-abutted and permanently joined rail sections in which each of such sections is of unitized, composite construction consisting of a power chain housing component and a trolley guide rail component, each power chain housing component comprising a box-sectioned tubular member having a longitudinally slotted bottom wall presenting coplanar upper rail flanges adapted to support the rollers of a power chain guide carriage, each trolley guide rail component including spaced, parallel side walls permanently joined to an associated power chain housing component and extending below the respective side walls thereof to terminate, along the lower edges of the trolley guide rail component side walls, in coplanar, horizontally inwardly directed lower rail flanges adapted to support the rollers of a load trolley, the two components of each section being welded together to collectively form a unitized, composite structure capable of sustaining the total loading imposed thereon and to establish and maintain a fixed vertical spacing between corresponding upper and lower rail flanges of the two components, each trolley guide rail component having the opposite ends of its side walls cut way to expose each end of a corresponding tubular member but leaving lower regions of the cut away side walls intact, the thus exposed ends of abutting tubular members and the abutting side wall lower regions being welded together to form said rail assembly.

6. The assembly as defined in claim 5 wherein each trolley guide rail component is in the form of a pair of vertically positioned and mutually opposed channel members, the top flanges of which overlie the top wall portion of said power chain housing component.

References Cited in the file of this patent

UNITED STATES PATENTS

| | | |
|---|---|---|
| 1,867,883 | Haddlesay | July 19, 1932 |
| 1,972,931 | Haddlesay | Sept. 11, 1934 |
| 2,725,973 | King | Dec. 6, 1955 |
| 2,915,169 | Abbey | Dec. 1, 1959 |
| 2,983,390 | Lang et al. | May 9, 1961 |

FOREIGN PATENTS

| | | |
|---|---|---|
| 23,921 of 1912 | Great Britain | May 22, 1913 |